United States Patent [19]

Wiley

[11] 4,277,220
[45] Jul. 7, 1981

[54] COMBINED LOAD COVER AND UNLOADER

[76] Inventor: Frederick R. Wiley, 343 E. Lexington Ave. Suite 108, El Cajon, Calif. 92020

[21] Appl. No.: 117,099

[22] Filed: Jan. 31, 1980

[51] Int. Cl.³ .............................. B60P 1/00; B60P 7/04
[52] U.S. Cl. ....................................... 414/539; 296/100
[58] Field of Search ............... 414/390, 393, 395, 402, 414/506, 539, 559; 296/100, 101; 298/1 B, 23 C

[56] References Cited

U.S. PATENT DOCUMENTS

| 1,069,219 | 8/1913 | Batten | 296/100 |
| 1,329,392 | 2/1920 | Ford | 414/395 |

Primary Examiner—Robert G. Sheridan

[57] ABSTRACT

An unloader, for hauling vehicles such as pick-up trucks, which is functional also as a load cover, being essentially an elongated apron of material which is flexible, of very high tensile strength and having a low friction characteristic, as well as being quite thin so that it can be wound into a relatively small diameter roll by a manually operated winch roller removably mounted on the rear end of the vehicle. When used as a combined load cover and unloader the winch roller is mounted on the vehicle near the top rear edge of the load-receiving box, extends forwardly along the bottom of the box so that the load, which is usually amorphous material, may be placed in the box and onto this part of the apron, a second part of the apron of the same width being returned rearwardly over the top of the load material to a winch roller to prevent the load material from being spilled or blown away in transit, unloading being accomplished by operation of the winch roller, generating a combined rearward tumbling and conveying action on the load material and the deposition thereof at the rear end of the hauling vehicle.

4 Claims, 7 Drawing Figures

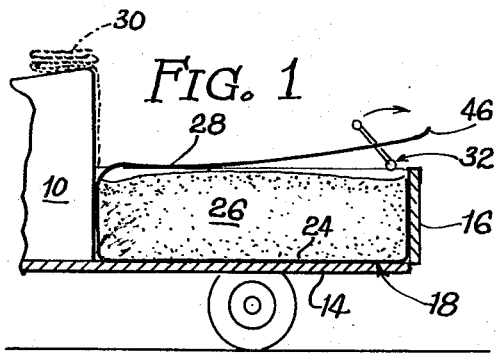
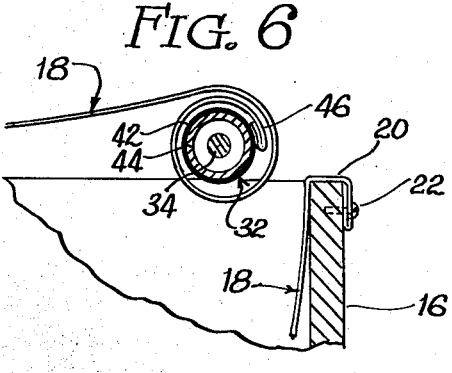
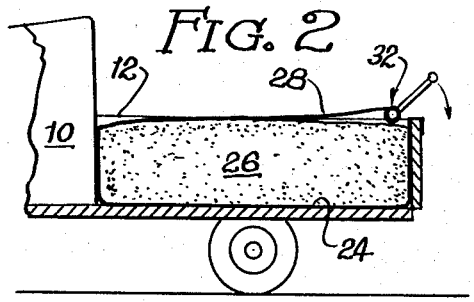
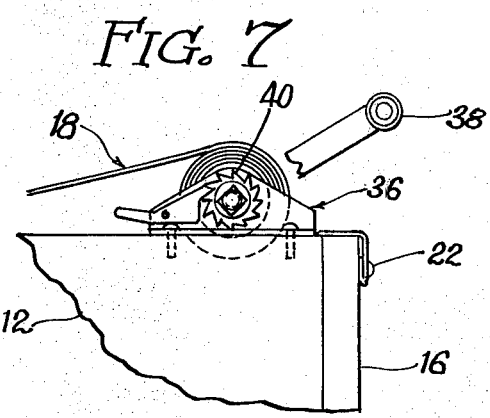
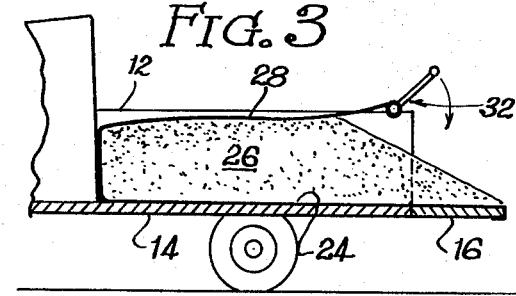
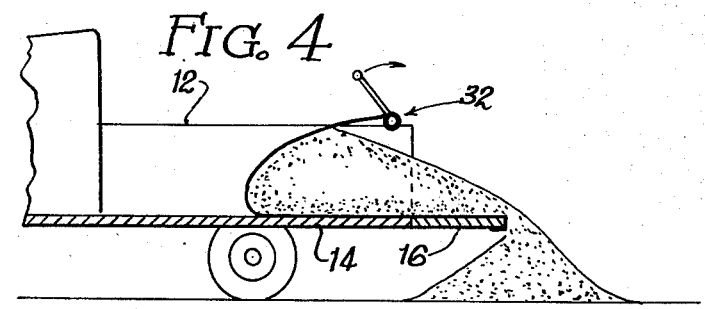
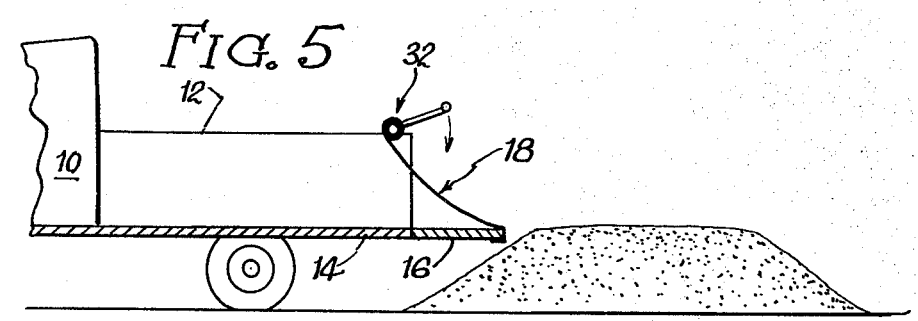

COMBINED LOAD COVER AND UNLOADER

BACKGROUND OF THE INVENTION

Various structures have been developed for unloading trucks, most of these being power operated, including the techniques of tilting the box of the vehicle, provision of rollers on the floor of the box, and flexible conveyors incorporated in the floor of the box. The last mentioned structure is disclosed in several U.S. Pat. Nos., notably Flinchbaugh, 2,551,368; Claffey, 2,563,158 and Lavelle et al., 2,595,395 and Turner et al., 2,537,381. These patents show the simple concept of a conveyor in the floor of the vehicle box and this concept is recognized as well known prior art. Variation of such concept is noted in Carpenture Jr. et al., 3,704,798 where pallets are slung on overhead rails, in Simo, 2,808,159 where the conveyor is segmented and mounted on top of fixed rails, in Buye et al., 2,515,334 where a principal part of the box per se is open bottomed and moves rearwardly to discharge the load. None of this prior art discloses a load cover combined with the conveyor. The closest to this concept being Ford, U.S. Pat. No. 1,329,392 which patent shows a cable used to pull a rope-reinforced fabric rearwardly from the top front end as the vehicle is advanced in order to unload the box. No load covers except those of tie-down tarpaulin type are presently available and there is a need for a simple cover structure to protect the load especially loads susceptible to wind during transit.

SUMMARY OF THE INVENTION

The instant invention is an adequate response to the immediate abovementioned need, combining the cover concept with a simple removable manually operated unloader, the cover being an extension of a conveyor-like elongated apron secured at the end to the lower rear portion of the box, extending forwardly under the load, and upwardly at the forward end of the box and returned rearwardly as a cover over the load in place. The other end of the cover portion of the apron is captured and held by a winch roller, which latter is operated to pull and tumble the load out of the box of the vehicle.

BRIEF DESCRIPTION OF THE DRAWING

FIG. 1 is a somewhat diagrammatic view of the rear portion of a loaded pick-up truck with a box, a swing down tailgate and the combination load cover and unloader, the cover portion of the apron being shown in stored position in dash line and in full lines as extended rearwardly prior to being terminally captured by the winch roller.

FIGS. 2-5 are similar views illustrating stages in use of the winch roller to first hold the cover in place and then to discharge the load over the tailgate and onto the ground.

FIG. 6 is a fragmentary view showing the attachment of one end of the apron to the tailgate, shown in cross-section, and the other end as being attached to the winch roller.

FIG. 7 is a similar view showing the ratchet and crank drive of the winch roller.

DETAILED DESCRIPTION OF A PREFERRED EMBODIMENT

Referring now to the drawing wherein like numerals refer to like or identical parts and portions throughout the views, the hauling vehicle represented as a pick-up truck 10 has a box 12 with a floor 14 and ordinarily a rear end closure such as the tailgate represented at 16.

An elongated apron 18 of flexible material of a width approximately equal to the width of box 12 has one end 20 secured by any suitable means 22 to the rear end portion of the box 12, illustrated as secured to the tailgate 16. This apron 18 comprises two principal portions or reaches, one reach 24 which extends along the floor 14 and under the load 26, and the other reach or load cover 28. In use, the load cover 28 is ordinarily stored as indicated at 30 upon an adjacent portion of the towing vehicle while the load is placed upon the reach 24 within the box 12. The cover 28 is of a length to extend rearwardly along the length of box 12, over the load 26, to the winch roller 32 and it will be noted that the overall length of the apron 18 is greater than twice the length of the box 12.

The winch roller 32 has a shaft 34 with bearings and mounting brackets 36 which are preferably removably secured to the box 12 adjacent to the rear top portion thereof, illustrated as immediately forwardly of the tailgate 16 and a hand crank 38 and ratchet 40 are provided at one of said brackets 36. A rubber sleeve 42 or the equivalent is secured upon the cylinder 44 carried by the shaft 34. In use, the terminal 46 of the cover portion of the apron is manually inserted to provide a single wrap around the rubber sleeve 42 and the crank 38 is used to turn the roller so that the terminal 46 is captured to hold the cover in place during transit. This terminal 46 is preferably hemmed and/or provided with reinforcement structure to assure certain non-slip gripping when the crank 38 and ratchet 40 are used in attaching the cover portion of the apron over the load.

The characteristics of the apron 18 are rather critical to assure satisfactory manual operation of the combined cover and unloader: the apron material should be quite thin, on the order of 0.010 to 0.015 inch gauge, the material must of course have great tensile strength and have low friction characteristics. One suitable material is the polyvinyl plastic sheet sold under the trademark Griff-Weave.

The operation of the invention will be obvious from the foregoing description, especially in view of the FIGS. 1-5 which indicate the steps used to secure the cover in place as in FIG. 1, supplemented by FIG. 6, and the progressive steps in lowering the tailgate and then operating the crank 38 to tumble and pull the load 26 out of the box 12 and onto the receiving surface as indicated in FIGS. 4 and 5, all by simply turning the crank 38. Complete discharge is indicated in FIG. 5.

What I claim as new, and desire to secure by Letters Patent, is:

1. A combined load cover and unloader for use in handling amorphous material and the like in a hauling vehicle having a box opening to the rear of the vehicle, said combined load cover and unloader comprising:
   a. an elongated apron of flexible, thin gauge material, with high tensile strength and of a width approximating the width of the box, one end of said apron having means for securement across the rear end portion of the box, and said apron having a length greater than twice that of said box to extend underneath a load of material in said box, around the forward end of such load and back over the load as a cover therefor;

b. a winch roller of a length substantially equal to the width of said apron, removably and operably mountable across the upper rear end portion of the box; and c. said winch roller having means for manual operation thereof and having means for easily removably attaching a second end of the apron to said winch roller.

2. Structure according to claim 1 wherein said means for easily removably attaching a second end of the apron comprises a rubber sleeve fixed on said roller whereby a single lap of the apron on the roller provides non-slip attachment thereof.

3. Structure according to claim 1 wherein said elongated apron is a thin sheet of polyvinyl low-friction plastic merchandised under the trademark Griff-Weave.

4. Structure according to claim 1 wherein said means for easily removably attaching a second end of the apron to said winch roller comprises a resilient sleeve on said roller in combination with a ratchet on the roller whereby a single wrap of said apron on said roller can be securely held to retain the load cover in place during transit.

* * * * *